Jan. 16, 1962     L. T. McDONNELL     3,017,037
LIGHT-WEIGHT HEAVY DUTY CONVEYOR CARRIER CAGE
Filed Jan. 8, 1960     3 Sheets-Sheet 1
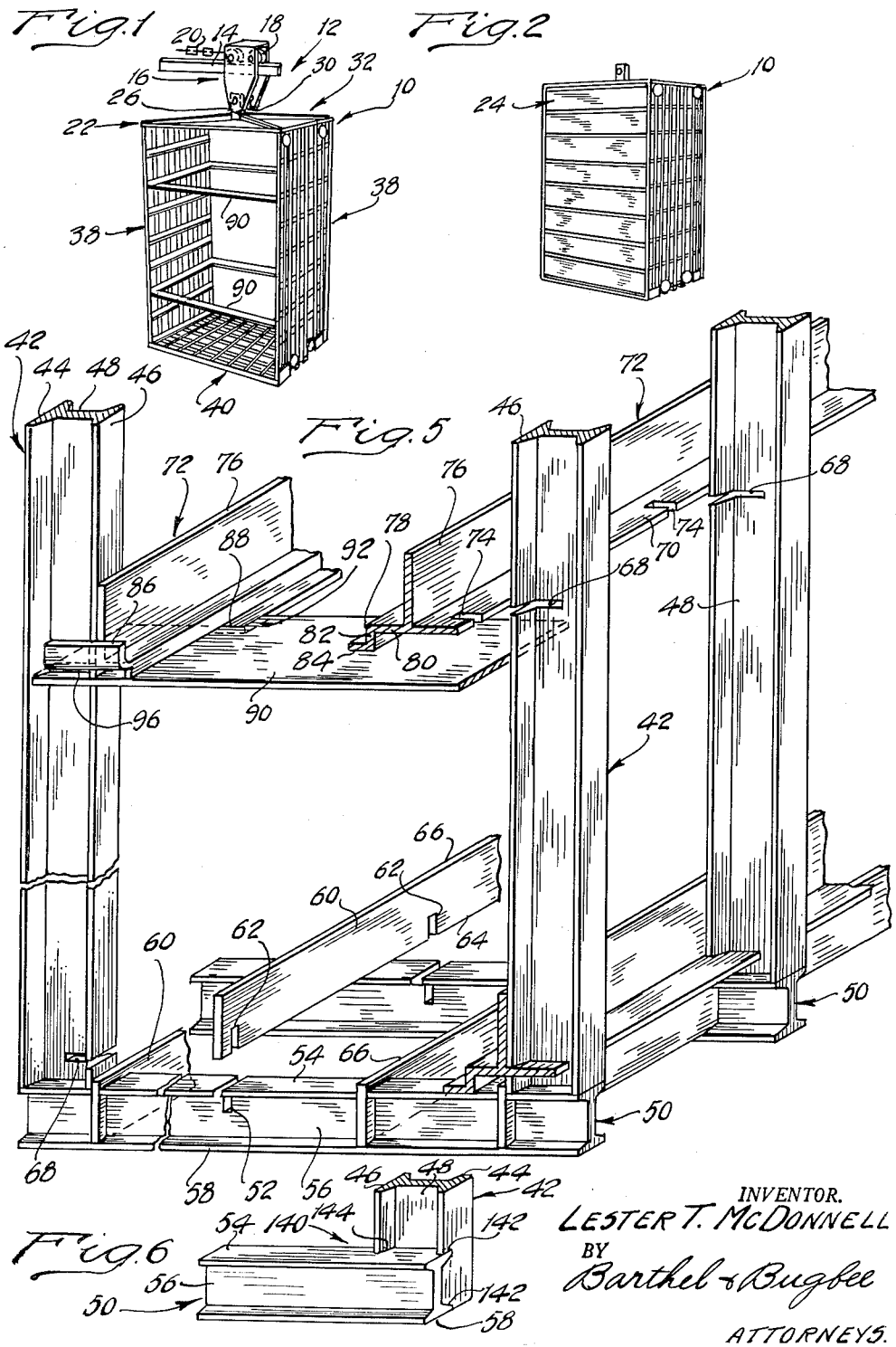
INVENTOR.
LESTER T. McDONNELL
BY
Barthel & Bugbee
ATTORNEYS.

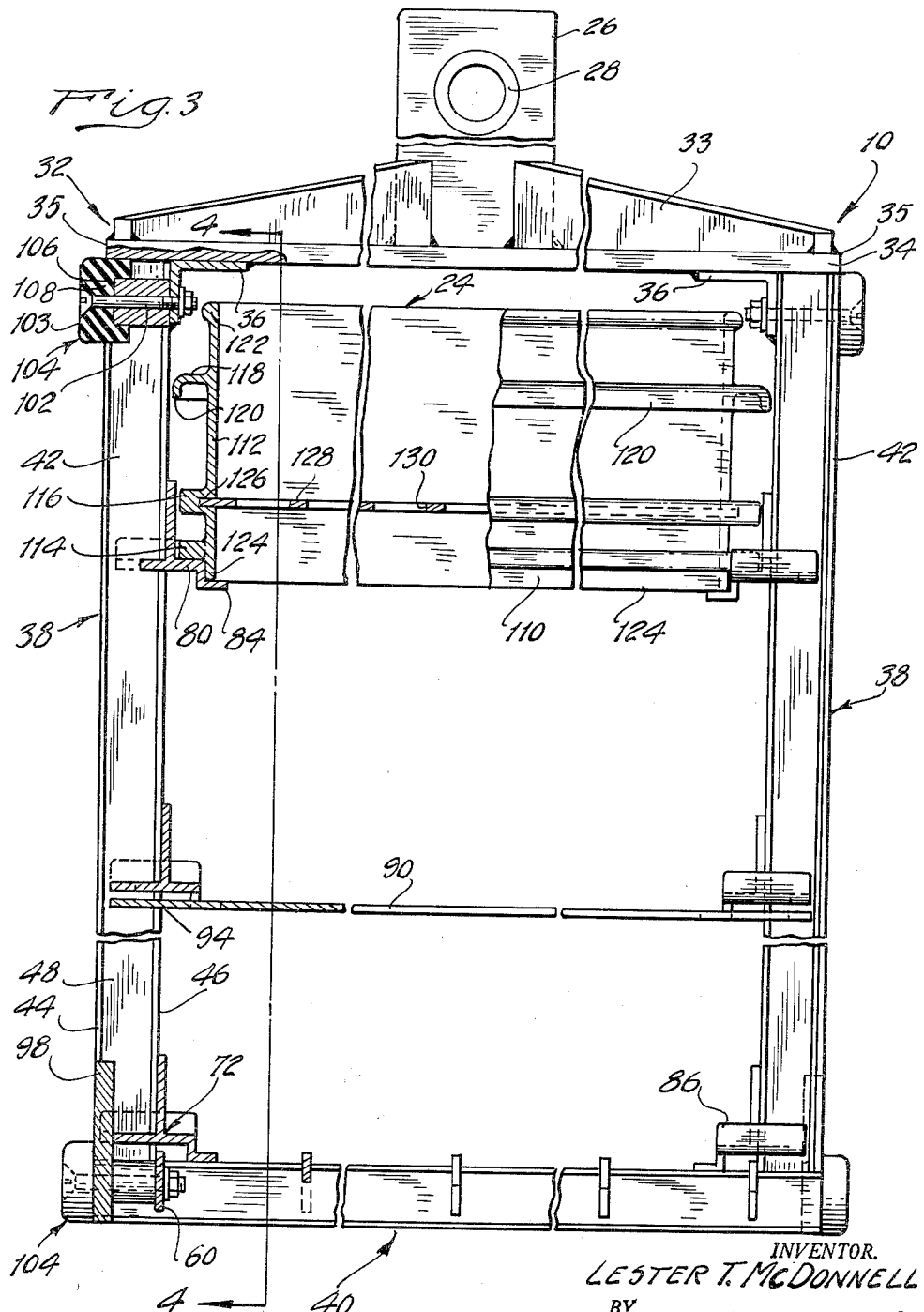

Jan. 16, 1962  L. T. McDONNELL  3,017,037
LIGHT-WEIGHT HEAVY DUTY CONVEYOR CARRIER CAGE
Filed Jan. 8, 1960  3 Sheets-Sheet 3

INVENTOR.
LESTER T. McDONNELL
BY
Barthel & Bugbee
ATTORNEYS.

United States Patent Office 3,017,037
Patented Jan. 16, 1962

3,017,037
LIGHT-WEIGHT HEAVY DUTY CONVEYOR CARRIER CAGE
Lester T. McDonnell, 5390 Cecelia Ann Ave., Clarkston, Mich.
Filed Jan. 8, 1960, Ser. No. 1,233
11 Claims. (Cl. 211—114)

This invention relates to conveyors and, in particular, to heavy duty load carriers for conveyors, such as trolley conveyors.

One object of this invention is to provide a lightweight heavy duty conveyor load carrier for trolley conveyors which is of exceptionally rigid construction yet is formed from lightweight material, such as aluminum, with the result that the carrier is capable of carrying heavy loads of articles or materials without deformation or breakage.

Another object is to provide a lightweight heavy duty conveyor load carrier of the foregoing character wherein the carrier consist of a cage composed of interconnected structural members and load holders in the form of drawers or trays slidably mounted in the cage.

Another object is to provide a lightweight heavy duty conveyor load carrier as set forth in the object immediately preceding, wherein the cage is so constructed with drawer retaining stops that the drawers or trays are normally held in the cage against accidental shifting or removal, yet are easily removed from the cage by lifting the forward end of the drawer or tray and sliding the remainder of the drawer outward upon guides which normally support the drawer or tray during travel of the cage with the conveyor.

Another object is to provide a lightweight heavy duty conveyor load carrier of the foregoing character wherein the cage framework is composed mainly of I-section and L-section members interlocked with one another or with bars in such a manner as to be quickly and easily secured in assembly by welding operations, with the result that the cage framework resists deformation spreading or "weaving" when subjected to heavy stresses or is dropped from considerable heights.

Other objects and advantages of the invention will become apparent during the course of the following description of the accompanying drawings, wherein:

FIGURE 1 is a somewhat diagrammatic perspective view of a lightweight heavy duty conveyor load carrier, according to one form of the invention, with the article holders removed;

FIGURE 2 is a perspective view similar to FIGURE 1, but with the article holders inserted;

FIGURE 3 is an enlarged fragmentary front elevation of the load carrier of FIGURES 1 and 2, with portions omitted to conserve space and with the left-hand side broken away in vertical section immediately behind the front corner of the cage, looking in the direction of the line 3—3 in FIGURE 4;

FIGURE 5 is a fragmentary perspective view of the lower portion of the conveyor carrier cage of FIGURES 3 and 4, with certain of the structural frame members in their assembled positions, others about to be placed in their assembled position; and FIGURE 6 is a fragmentary perspective view of a modification of the invention from that shown in the lower portion of FIGURE 5.

Figure 4:
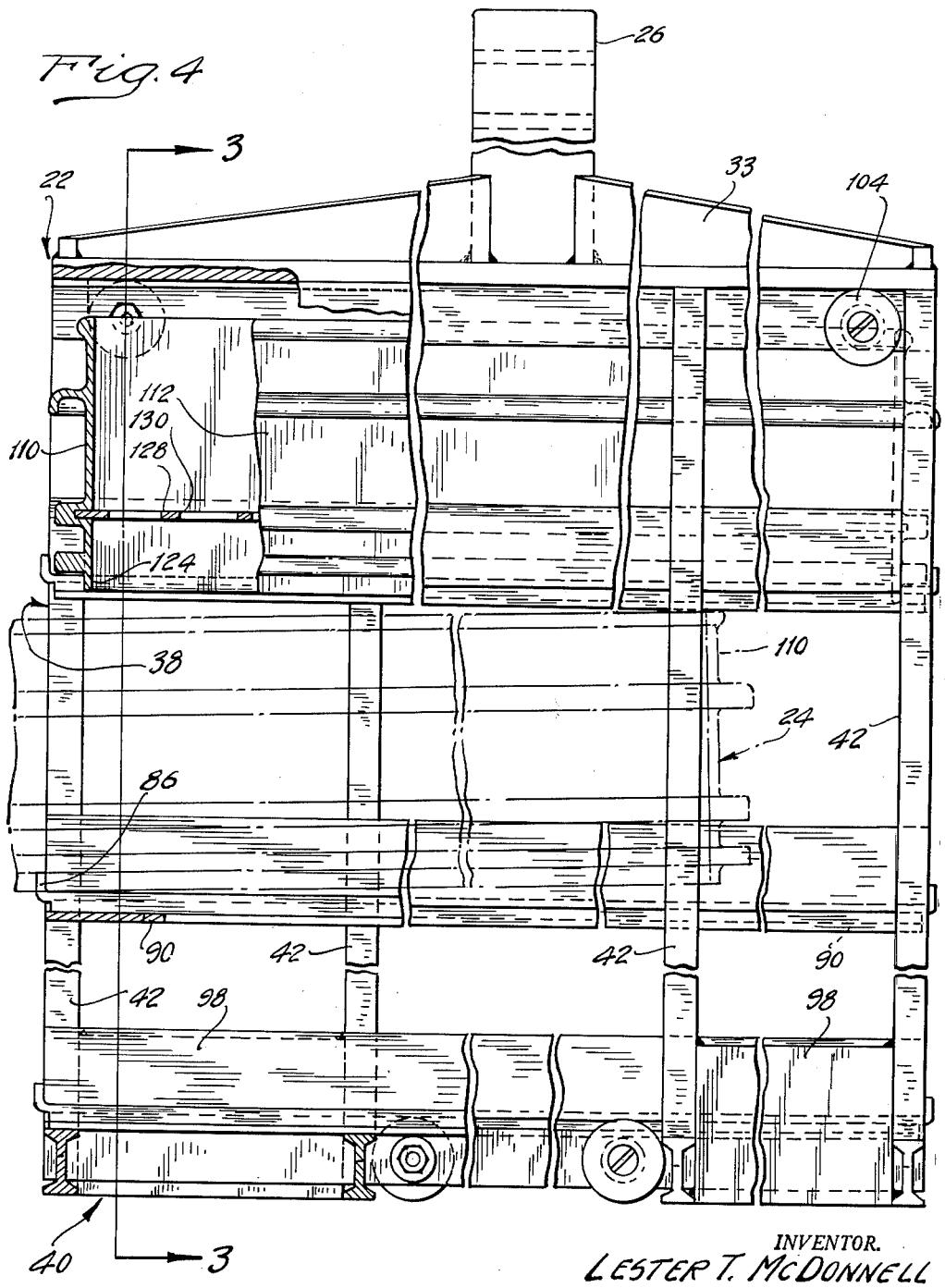
FIGURE 4 is a right-hand side elevation of the load carrier of FIGURES 1 to 3 inclusive with the left-hand or front portion in vertical section along the line 4—4 in FIGURE 3.

Hitherto, overhead travelling conveyors and other conveyors for transporting articles and materials have made use of article or material carriers consisting of frames or cages secured to the conveyor and article holders, such as drawers or trays, which are mounted in and carried by the cages. Such prior conveyor load carriers, however, have had the disadvantage of being structurally inadequate to prevent spreading or other deformation while transporting heavy loads unless made with excessively heavy structural members to resist such deformation. The resulting excessive weight of such load carriers, however, made them objectionable by being difficult to handle, producing excessive friction during motion and requiring excessive power for conveyor operation.

The present conveyor load carrier avoids these disadvantages of prior conveyor carriers by the special construction set forth in the above objects and in the following description, which special construction enables the use of structural members of lightweight metals or metal alloys yet possesses a rigidity and resistance to deformation exceeding those of conveyor carriers employing much heavier structural members, with the result that spreading or other deformation is effectively prevented and the power requirements for moving the loads are at a minimum.

Referring to the drawings in detail, FIGURES 1 and 2 show diagrammatically a lightweight heavy duty conveyor load carrier, generally designated 10, according to one form of the invention, as suspended from a conventional overhead trolley conveyor 12, the details of which are beyond the scope of the present invention. Accordingly, the conveyor 12 is merely shown as a short length of a rail 14 upon which a carriage or trolley 16 is mounted and which is supported by rollers 18 upon the flanges of the rail 14 and propelled by a suitable conveyor chain 20 driven by a motor and sprockets (not shown) familiar to skilled workers in the overhead or trolley conveyor field. The conveyor load carrier 10 in turn consists generally of a cage or framework 22 in which is mounted a stack of article holders 24 (FIGURE 2), such as drawers or trays, in a manner described more in detail in connection with FIGURES 3 to 5 inclusive. FIGURES 1 and 2 merely show the principal elements of the load carrier 10 in order to indicate the general relationship between the parts thereof.

The cage 22 which supports the article holders 24 is preferably constructed of structural members formed by extrusion of lightweight metal or lightweight metal alloys, aluminum or aluminum alloys having been found satisfactory for this purpose. The load carrier 10 is suspended from the carriage 16 by a post or block 26 constituting a conveyor coupling element and transversely bored to receive a bearing bushing 28 through which a pivot bolt or stud 30 (FIGURE 1) passes for pivotally securing the load carrier 10 to the conveyor carriage 16.

The post 26 is welded or otherwise secured at its lower end to a top structure 32 including a top plate 34 of rectangular shape and supporting wedge-shaped diagonal braces 33 welded thereto and in turn welded or otherwise secured to the lower portion of the post 26. In this manner, the top plate 34 is strengthened and assisted in resisting deformation, and the load forces are transmitted from the framework below the top plate 34 to the post 26 and thence to the conveyor carriage 16 and rail 14 of the conveyor 12.

Welded or otherwise secured to the under side of the top plate 34 near the opposite side edges 35 thereof are two spaced parallel angle members 36 (FIGURE 3) which in turn are spaced laterally inward from the side edges 35 of the plate 34 to receive the upper ends of two laterally-spaced latticed side structures 38 which in turn are welded at their lower ends to a latticed bottom structure 40. Each side structure 38 is composed of vertical I-section members (FIGURE 5) having outer and inner flanges 44 and 46 interconnected by a web 48.

The vertical I-section members are designated 42 and their upper ends abut the top plate 34 and are welded or otherwise secured thereto and to the angle members 36. Their lower ends similarly abut and are weldeed to horizontal I-section cross members 50. The I-section members 50 in turn are slotted at 52 at intervals thereacross with the slots 52 passing through their upper flanges 54 and approximately halfway into their webs 56 without reaching their lower flanges 58.

The cross members 50, which are disposed in spaced parallel relationship from front to rear of the cage 22 are joined to one another by tie bars 60 of elongated rectangular cross-section having spaced notches 62 extending upward from their lower edges and adapted to be superimposed upon the notches 52 in interengaging relationship, with the lower edges 64 of the tie bars 60 resting upon the lower flanges 58 and the upper edges 66 projecting slightly above the upper flanges 54. The notches 52 and 62 are made of slightly less width than the thicknesses of the webs 56 and bars 60 respectively so that the assembling operation, when performed in a hydraulic press, produces a press fit of these parts with a galling action of the aluminum or other similar metal, enhancing the permanent gripping of the parts to one another. In a similar manner, the vertical I-section members 42 are provided with notches 68 at intervals throughout their vertical lengths and extending approximately halfway into their webs 48 through their inner flanges 46 to receive the outer horizontal flanges 70 of article holder supporting members or guide bars 72 of roughly inverted T-section shape.

The article holder supporting members or guide bars 72 have corresponding notches 74 at intervals and the same relationships exist between the widths of the notches 68 and 74 and the thicknesses of the flanges 70 and webs 48 for press fits and falling action as those described immediately above. The guide bars 72 have vertical flanges 76 (FIGURE 5) and stepped inner portions 78 of approximately Z-section shape having upper inner horizontal flanges 80 on approximately the same level as the outer horizontal flanges 70 so as to form, in effect, continuations thereof. The upper inner flanges 80 are connected by depending or downwardly-extending webs 82 to inwardly-extending lower horizontal flanges 84. The depths of the notches 68 and 74 are so proportioned that the vertical flanges 76 of the guide members 72 abut the inner flanges 46 of the vertical members 42 when the parts have been assembled in a hydraulic press or by other suitable means, as shown in the lower right-hand corner and upper left-hand corner of FIGURE 5. The outer and inner horizontal flanges 70 and 80 of the guide bars 72 terminate in upturned end stops 86 as seen in the upper left-hand corner of FIGURE 5 for preventing accidental withdrawal of the article holders 24 shown in FIGURE 2.

In order to further strengthen the cage 22, the two vertically-spaced pairs of the guide bars 72 are cut away near the forward and rearward ends of their lower inner flanges 84 at the locations indicated by the reference numerals 88 (FIGURE 5) to receive, on the same level as the flanges 84, lower and upper pairs of forward and rearward horizontal cross plates 90 (FIGURES 1, 4 and 5). The cross plates 90 at their opposite ends near the cutaway portions 88 are similarly cut away as at 92 (FIGURE 5) in order to interfit with one another on the same level. The cross plates 90 at their opposite ends and the vertical I-section members 42 are provided with interengaging notches 94 and 96 respectively (FIGURES 3 and 5) of widths proportioned to the thicknesses of the cross plates 90 and webs 48 to produce press fits and galling effect of the metal during assembly, as explained previously above.

The cage 22 is further strengthened by the presence of vertical corner tie plates 98 shown in cross-section in the lower left-hand corner of FIGURE 3 and in side elevation in the lower right- and left-hand corners of FIGURE 4. These vertical tie plates 98 extend from the outermost or foremost and rearmost vertical members 42 to the vertical members 42 next adjacent thereto (FIGURE 4) with the opposite ends of the tie plates 98 abutting and welded to the facing edges of the outer flanges 44 and webs 48 (FIGURE 3) flush with the outer flanges 44. In a similar manner, the lower portions of the opposite ends of the vertical tie plates 98 also abut and are welded to the edges of the upper and lower flanges 54 and 58 of the I-section cross members 50, as seen at the bottom of FIGURE 4.

The vertical flanges of the angle members 40 and the outermost tie bars 60 are drilled near the upper and lower corners of the cage 22 to receive the supporting bolts 102 of bumpers, generally designated 104. Besides the supporting bolts 102, the bumpers 104 consist of cylindrical inner or supporting bodies 106, as seen in the upper left-hand corner of FIGURE 3, and cup-shaped buffers or cushion elements 108 fitting thereover, the whole being held in assembly by the bolts 102 against their respective angle members 40 or tie bars 60, as the case may be.

Each of the article holders 24, one of which is shown at the top of FIGURES 3 and 4, consists of vertical end walls 110 (FIGURE 4) interconnected by vertical side walls 112, the ends of these walls being mitered or bevelled at angles of 45 degrees and welded to one another. The vertical walls 110 and 112 are also preferably of lightweight metal or metal alloys, such as aluminum or aluminum alloys, and, like the other members previously mentioned, are conveniently produced by extrusion. Each of the vertical walls 110 and 112 is provided with outwardly-extending lower, intermediate and upper ribs 114, 116 and 118 respectively (FIGURE 3), the upper rib 118 being downwardly flanged to provide a finger pull flange 120. The upper edge 122 of each of the walls 110 and 112 is beaded, and the lower edge 124 of each of the opposite side members 112 is flat and rests upon the lower inner flange 84 of its respective guide bar 72 for sliding engagement therewith. The lower ribs 114 are spaced slightly above the upper inner flanges 80 to provide a slight clearance therebetween. The walls 110 and 112 inwardly of the intermediate ribs 116 are grooved as at 126 (FIGURE 3) to receive the edges of bottom plates or walls 128. The bottom walls 128 may be imperforate to hold conveyed materials or articles, or, as shown in the upper left-hand corner of FIGURE 3, they may be provided with spaced holes 130 for receiving the shanks or stems of articles or workpieces to be conveyed, in order to space the workpieces apart from one another in the article holders 24, such as drawers or trays.

In the operation of the invention, let it be assumed that the cages 22 have been mounted on the conveyor carriages or trolleys 16 and are empty, as shown in FIGURE 1, and that it is desired, at the loading station, to insert the article holders 24, such as drawers or trays, which it will be assumed have been loaded with the articles to be conveyed. To do so, the operator while holding the article holder 24 with his fingers beneath the flange 120 of the upper ribs 118 tilts the article holder 24 upward at its rearward end, as shown in the central portion of FIGURE 4, and inserts it into the space immediately above a pair of the guide bars 72 above the upturned ends or stops 86 so as to clear the latter. The operator then pushes inward upon the drawer or other article holder 24 until the rearward end wall 110 reaches the rearward end of the cage 22, whereupon the front wall 110 is lowered into the position shown in the upper left-hand corner of FIGURE 4 with its lower edge 124 behind the forward stops or upturned ends 86. When this occurs, the lower edges 124 of the opposite side walls 112 rest upon the inner lower flanges 84 and the lower ribs 114 are spaced slightly above the upper inner flanges 80 of the guide bars 72 with a slight clearance therebetween to prevent their frictional engagement.

This operation is repeated for each of the drawers or other article holders 24 until each cage 22 has been filled with a stack of the article holders 24, whereupon the conveyor 12 is started in operation so as to transport the load carriers 10 to their destinations. At the destination or unloading station, each of the article holders 24 is removed from its respective cage 22 by reversing the foregoing procedure. For this purpose, the operator inserts his fingers under the finger pull flange 120 of the front wall 110 and lifts upward upon it to lift the lower edge 124 of the front wall 110 over the front stops 86. He then pulls outward to remove the drawer or tray 24 constituting the article holder and the operation of unloading the transported articles from the individual article holders 24 is then carried out.

The modified cage construction, generally designated 140, shown in FIGURE 6, employs the same horiontal and vertical I-section members 50 and 42 respectively, but provides additional strength and resistance to "weaving" or parallelogram pivoting action. For this purpose, the vertical I-section members 42 have their outer and inner flanges 44 and 46 notched as at 142 and 144 respectively at vertically-spaced locations to snugly receive the upper and lower flanges 54 and 58 of the horiontal I-section members 50. The notches 142 and 144 are made of such depths that the web 56 engages the edges of the flanges 44 and 46 of the vertical I-section members 42. Welding is then carried out, as before, to secure the flanges 54 and 58 in their respective notches 142 and 144 and also to secure the webs 56 to the flanges 44 and 46.

What I claim is:

1. A light-weight heavy duty conveyor load carrier cage comprising an open-front box-shaped framework having vertically-spaced substantially horizontal top and bottom structures and horizontally-spaced substantially vertical opposite side structures secured at their upper and lower ends to said top and bottom structures respectively, a conveyor coupling element secured to said top structure, and a multiplicity of sets of load-supporting members secured to the inner sides of said vertical side structures in vertically-spaced relationship, each set having its respective load-supporting members disposed approximately in a common horizontal plane, said vertical side structures including horizontally-spaced elongated parallel vertical I-section bars with vertical webs and spaced parallel vertical flanges integral therewith, certain of the flanges of said vertical bars facing inwardly and having inwardly-facing notches disposed at vertically-spaced intervals on the inner sides thereof and said load-supporting members comprising elongated horizontal bars having outwardly-facing notches disposed in tightly-pressed interlocking engagement with said inwardly-facing notches.

2. A light-weight heavy duty conveyor load carrier cage, according to claim 1, wherein said horizontal bars have inwardly-extending flanged portions.

3. A light-weight heavy duty conveyor load carrier cage, according to claim 2, wherein said inwardly-extending flanged portions are of approximately Z-shaped cross-section.

4. A light-weight heavy duty conveyor load carrier cage, according to claim 3, wherein said horizontal bars also have vertical flanges disposed adjacent said vertical side structures.

5. A light-weight heavy duty conveyor load carrier cage, according to claim 1, wherein said bottom structure includes substantially horizontal laterally-directed I-section bars having their opposite ends aligned with and connected to the lower portions of said I-section bars of said side structures and extending therebetween in horizontally-spaced parallel relationship, and wherein said horizontal laterally-directed I-section bars are aligned with said vertical I-section bars and have their outer ends secured thereto.

6. A light-weight heavy duty conveyor load carrier cage, according to claim 5, wherein said laterally-directed I-section bars have upwardly-facing notches disposed at horizontally-spaced intervals on the upper side thereof and wherein said bottom structure also includes laterally-spaced horizontally-extending tie bars disposed transversely to said horizontal I-section bars and having longitudinally-spaced downwardly-facing notches on the lower sides thereof disposed in snugly-interlocking engagement with said upwardly-facing notches.

7. A light-weight heavy duty conveyor load carrier cage, according to claim 1, wherein said conveyor coupling element comprises an upstanding member secured at its lower end to said top structure, and wherein said top structure includes a substantially rectangular plate to which is secured the lower end of said upstanding member and also includes diagonal brace members secured to said plate and to said upstanding member and extending substantially from the corners of said plate to said upstanding member.

8. A light-weight heavy duty conveyor load carrier cage, according to claim 1, wherein said top structure includes a substantially horizontal plate and elongated members of angle cross-section with horizontal flanges secured thereto and vertical flanges depending therefrom and wherein the upper ends of said vertical members are secured to said vertical flanges.

9. A light-weight heavy duty conveyor load carrier cage, according to claim 8, wherein the upper ends of said vertical members are also secured to said plate.

10. A light-weight heavy duty conveyor load carrier cage, according to claim 5, wherein said vertical side structures include horizontally-spaced elongated parallel vertical I-section bars having flanges with vertically-spaced notches therein, and wherein said horizontal I-section bars have flanges snugly fitting into said notches and secured therein.

11. A light-weight heavy duty conveyor load carrier cage, according to claim 10, wherein said horizontal I-section bars have webs abutting the flanges of said vertical I-section bars and secured thereto.

References Cited in the file of this patent

UNITED STATES PATENTS

| | | |
|---|---|---|
| 751,466 | Colling | Feb. 9, 1904 |
| 1,691,621 | Young | Nov. 13, 1928 |
| 1,708,588 | Proctor | Apr. 9, 1929 |
| 1,955,668 | Botz | Apr. 17, 1934 |
| 2,266,870 | Kraeft | Dec. 23, 1941 |
| 2,398,153 | Nielsen | Apr. 9, 1946 |
| 2,440,513 | Kaelin et al. | Apr. 27, 1948 |